US012699828B2

(12) United States Patent (10) Patent No.: US 12,699,828 B2

Shen et al. (45) Date of Patent: Aug. 4, 2026

(54) UNIFIED FRAMEWORK AND METHOD FOR ACCURATE CONTEXT-AWARE TIMING MODELING

(71) Applicant: Synopsys, Inc., Mountain View, CA (US)

(72) Inventors: Ruijing Shen, Sunnyvale, CA (US); Li Ding, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 804 days.

(21) Appl. No.: 17/961,415

(22) Filed: Oct. 6, 2022

(65) Prior Publication Data

US 2023/0110560 A1 Apr. 13, 2023

Related U.S. Application Data

(60) Provisional application No. 63/262,206, filed on Oct. 7, 2021.

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
CPC ............. G06F 30/3312; G06F 2119/12; G06F 2111/10; G06F 30/3315; G06F 30/367; G06F 30/398; G06F 30/392
See application file for complete search history.

(56) References Cited

U.S. PATENT DOCUMENTS

| | | | | |
|---|---|---|---|---|
| 11,068,637 B1 * | 7/2021 | Hsu | ...................... | G06F 30/398 |
| 2008/0022235 A1 * | 1/2008 | Chew | ..................... | G06F 30/39 |
| | | | | 716/132 |
| 2008/0052653 A1 * | 2/2008 | Tuncer | ................ | G06F 30/3312 |
| | | | | 716/51 |
| 2009/0013292 A1 * | 1/2009 | Brunet | ................ | G06F 30/3312 |
| | | | | 716/113 |
| 2010/0275167 A1 * | 10/2010 | Fu | .......................... | G06F 30/392 |
| | | | | 716/132 |
| 2012/0210284 A1 * | 8/2012 | Datta | .................... | G06F 30/367 |
| | | | | 716/112 |
| 2014/0007029 A1 * | 1/2014 | Boone | ................... | G06F 30/392 |
| | | | | 716/110 |

(Continued)

OTHER PUBLICATIONS

PCT International Search Report and Written Opinion for International Application No. PCT/US2022/046114, mailed Feb. 17, 2023, 14 pages.

(Continued)

*Primary Examiner* — Nha T Nguyen
(74) *Attorney, Agent, or Firm* — Lowenstein Sandler LLP

(57) ABSTRACT

A processing device determines cell boundary conditions for each of a plurality of boundaries of a cell in an integrated circuit layout and determines a layout dependent effect (LDE) impact for the cell based on the cell boundary conditions for each of the plurality of boundaries of the cell. The processing device further generates a prediction of an LDE impact on one or more contents of a library associated with the cell, and performs an LDE-aware timing analysis for the cell based on the prediction of the LDE impact on the one or more contents of the library.

20 Claims, 8 Drawing Sheets

400

Determine cell boundary conditions for cell
405

Determine respective LDE impacts based on cell boundary conditions for each boundary of cell
410

Compute combined LDE impact for cell
415

Predict LDE impact on contents of cell library
420

Perform LDE-aware timing analysis for the cell
425

(56) References Cited

U.S. PATENT DOCUMENTS

| 2014/0304673 | A1* | 10/2014 | Huang | G06F 30/398 |
| | | | | 716/122 |
| 2015/0356227 | A1* | 12/2015 | Walker | G06F 30/3323 |
| | | | | 716/113 |
| 2017/0004241 | A1* | 1/2017 | Malashevich | H10D 89/10 |
| 2018/0173832 | A1* | 6/2018 | Pittu | G06F 30/398 |
| 2018/0314783 | A1* | 11/2018 | Moroz | G06F 30/367 |
| 2021/0117603 | A1* | 4/2021 | Jiang | G06F 30/398 |
| 2021/0333320 | A1* | 10/2021 | Thyagarajan | G01R 31/2882 |
| 2023/0306181 | A1* | 9/2023 | Liu | G06F 30/39 |

OTHER PUBLICATIONS

Hurat, Philippe et al., "Timing variability analysis for layout-dependent-effects in 28nm custom and standard cell-based designs", Design for Manufacturability Through Design-Process Integration V, vol. 7974, No. 1, Mar. 17, 2011, pp. 1-13, XP060008795.
Trihy, Richard T: "Addressing library creation challenges from recent Liberty extensions", Proceedings of the Design Automation Conference, Jun. 8, 2008 (Jun. 8, 2008), pp. 474-479, XP058125935.

* cited by examiner

400

Determine cell boundary conditions for cell
405

Determine respective LDE impacts based on cell
boundary conditions for each boundary of cell
410

Compute combined LDE impact for cell
415

Predict LDE impact on contents of cell library
420

Perform LDE-aware timing analysis for the cell
425

Input Transition = 5.6ps

A    Z

Output Load Cap = 0.5fF rise_transition

Output Voltage Wavefrom

Slew Upper Threshold cell_rise

Delay Threshold

Slew Lower Threshold

Voltage

Input Switch Time     Time

UNIFIED FRAMEWORK AND METHOD FOR ACCURATE CONTEXT-AWARE TIMING MODELING

RELATED APPLICATIONS

This application claims the benefit of U.S. Provisional Patent Application No. 63/262,206, filed Oct. 7, 2021, the entire contents of which are hereby incorporated by reference herein.

TECHNICAL FIELD

The present disclosure relates to the field of integrated circuit design, and in particular to a unified framework and method for accurate context-aware timing modeling in integrated circuit design.

BACKGROUND

Performance of cells is increasingly affected by the neighboring cells in advanced nodes. This effect is known as layout dependent effect (LDE) or local layout effect (LLE). These terms are used interchangeably in this disclosure. Context aware timing analysis refers to a timing analysis that takes into account LDE or LLE.

Layout dependent effects are highly technology dependent. Traditionally, timing derates representing the timing impact of a given cell are used to model these layout dependent effects. Such timing derates are not very accurate since they are neither timing arc aware, nor input slew/output load capacitance aware. In advanced nodes, LDE impact is becoming more severe. More accurate modeling is needed to reduce design margin and improve performance power area (PPA).

Leading foundries and key customers have made many requests for context-aware timing support in electronic design automation (EDA) tools. Most of these requests, however, are ad hoc applying only to one specific technology node.

SUMMARY

A processing device determines cell boundary conditions for each of a plurality of boundaries of a cell in an integrated circuit layout and determines a layout dependent effect (LDE) impact for the cell based on the cell boundary conditions for each of the plurality of boundaries of the cell. The processing device further generates a prediction of an LDE impact on one or more contents of a library associated with the cell, and performs an LDE-aware timing analysis for the cell based on the prediction of the LDE impact on the one or more contents of the library.

In one embodiment, determining the cell boundary conditions comprises identifying a presence of one or more neighboring cells at each of the plurality of boundaries of the cell in the integrated circuit layout. In one embodiment, the LDE impact is based on non-linear delay model (NLDM) timing data for the cell. In one embodiment, determining the LDE impact for the cell comprises determining respective LDE impacts based on the cell boundary conditions for each of the plurality of boundaries of the cell. In one embodiment, the processing device further computes a combined LDE impact for the plurality of boundaries of the cell, wherein computing the combined LDE impact comprises combining the respective LDE impacts for each of the plurality of boundaries of the cell using linear superposition.

In one embodiment, the one or more contents of the library comprise at least one of CCST, CCSN, or LVF, and wherein the one or more contents of the library associated with the cell do not already account for LDE impact. In one embodiment, the cell comprises one instance of a standard cell among a plurality of cells in an integrated circuit design, and wherein the method further comprises performing an LDE-aware timing analysis for each of the plurality of cells in the integrated circuit design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a unified framework and method for accurate context-aware timing modeling in integrated circuit design. In one embodiment, the unified framework can cover all technology nodes and accurately model the context-aware timing impact with significantly reduced library characterization overhead.

In the proposed unified modeling framework, LDE impact on timing is divided into two major components, including a technology-dependent component, and a technology-independent component. The technology-dependent component defines the collection of unique contexts or boundary conditions of a specific technology node, while the technology-independent component accurately models timing impact of a given context or boundary condition. The technology independent component is timing-arc (i.e., transition) aware and slew/load aware, and therefore, is significantly more accurate than any traditional timing derate based method.

This new methodology can enable unified support among all technology nodes. It can significantly reduce development and maintenance costs of context-aware timing support in EDA tools. There are also two novel methods to significantly reduce library characterization overhead for LDE impact on timing modeling to make it practical. The combined LDE impact on timing can be accurately modeled with multiplicative effects of each individual components from standard cell boundaries. This reduces library characterization requirement from N^K combinations to N*K, where N is number of boundary conditions (e.g., N=10) and K is number of boundaries (e.g., K=4). In addition, all context-aware library data needed by static timing analysis (STA) tools can be computed using existing library data and context-aware non-linear delay model (NLDM) data. This significantly reduces library size overhead because LDE-aware CCST and CCSN (very large in library size) is not needed. It also significantly reduces library characterization runtime overhead because LDE-aware LVF (requires high characterization runtime) is not needed.

Advantages of the unified framework and method for context-aware timing modeling include, but are not limited to, improved performance of the EDA system. By separating LDE impact to technology independent and technology dependent components, the unified framework can be used to dramatically reduce modeling complexity for different technology nodes. Also, library characterization runtime and library size overhead are significantly reduced by converge N-dimensional problem to N 1-dimensional problems. In addition, all of the context-aware library data needed by STA tools using existing library data and context-aware NLDM data can be computed.

Figure 1:
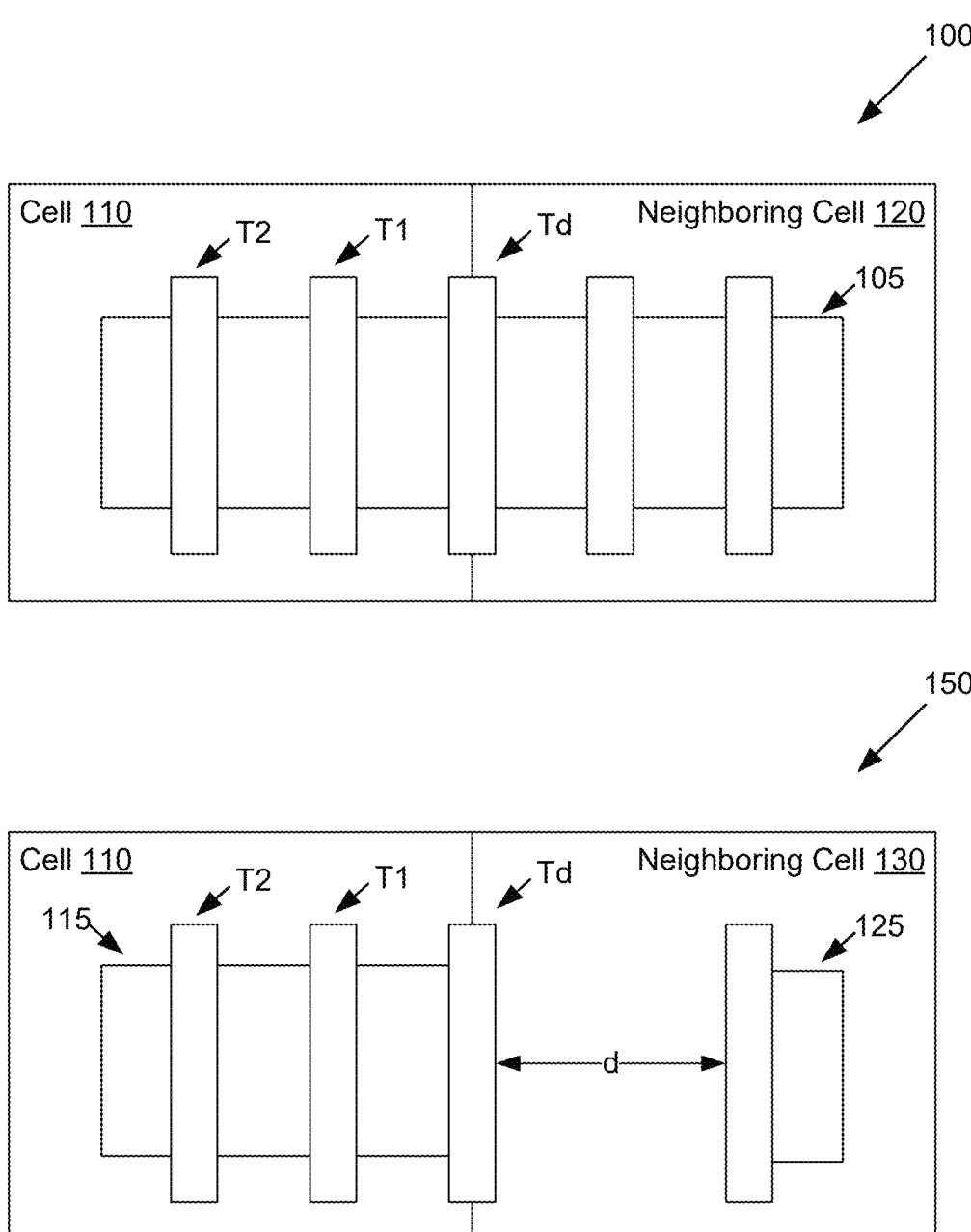
FIG. 1 is a block diagram illustrating different types of cell boundary conditions in integrated circuit design in accordance with some embodiments of the present disclosure.

FIG. 1 is a block diagram illustrating different types of cell boundary conditions in integrated circuit design in accordance with some embodiments of the present disclosure. The performance of a cell, such as cell 110, including the associated timing impact, is increasingly affected by neighboring cells in advanced nodes due to stress sources in the neighboring cells becoming closer to the cell 110 with continued technology scaling. Cell 110 can be for example, a standard cell, which has been pre-designed and pre-verified as a building block for the circuit design. A standard cell can be formed from a group of transistor and interconnect structures that provide a specific function or functions and generally has a defined size (e.g., height) enabling it to be placed in a row with neighboring cells to ease the circuit design process. As depicted in FIG. 1, the performance of cell 110 is affected by a neighboring cell, such as cell 120 or cell 130. In the circuit design 100, cell 110 is adjacent to neighboring cell 120. As illustrated, cell 110 includes transistors T1 and T2, with a dummy transistor Td positioned at the boundary of cell 110. Cell 110 and cell 120 share a continuous diffusion layer 105, as cell 120 includes transistors positioned near the boundary with cell 110.

In circuit design 150, cell 110 is adjacent to neighboring cell 130. In cell 130, the first transistor is positioned a distance d from the boundary with cell 110. In cell 110 and cell 130 the transistors are generally positioned with a fixed amount of spacing between them, which can be referred to as the pitch. In cell 130, the distance d is greater than the normal pitch, and may be approximately twice the normal pitch. Since there is a break between the diffusion layer 115 of cell 110 and the diffusion layer 125 of cell 130, this diffusion break introduces additional stress, which can change the affect from cell 130 on the associated timing in cell 110.

Furthermore, the performance of each transistor inside cell 110 can be affected differently. For example, transistor T1 can be affected more since it is closest to the boundary with the neighboring cell (e.g., cell 120 or cell 130), while transistor T2 is affected less because it is slightly farther away from the boundary and also is partially shielded by transistor T1. As a result, timing degradation due to LDE is not uniform for all timing arcs and using a single timing derate for all timing arcs of cell 110 can be grossly inaccurate. These timing arcs can represent the timing characteristic of the cell, including the amount of delay introduced to a signal passing through the cell by any of one or more signal paths including the various different transistors that make up the cell, as well as any other constraints on the timing. Accordingly, determining an accurate timing analysis for cell 110 can be challenging, particularly if it is not known in advance what, if any, the neighboring cell or cells will be.

For example, a standard cell with multiple inputs and a single output, such as an AND-OR-Invert (AOI22) cell having four inputs (e.g., A1, A2, B1, and B2) and one output (e.g., Z), can include different paths from each respective input to the output. Each of these different signal paths can have a different timing arc. Depending on which transistors are part of which signal path, and where those transistors are located relative to a boundary of the standard cell, the LDE impact on each timing arc can be different for each. In addition, depending on the embodiment, the dominant sources of stress may not be the same across different technology nodes. For example, there can be differences in cells formed using poly over diffusion edge (PODE), connected poly over diffusion edge (CPODE), continuous oxide diffusion (CNOD), single diffusion breaks/double diffusion breaks (SDB/DDB), gate-all-around (GAA), etc. Instead of adding context-aware timing modeling for each technology in an ad hoc manner, in one embodiment, a unified framework for a context-aware timing model can be used to cover different technology nodes, and accurately model the context-aware timing impact with significantly reduced library characterization overhead.

Figure 2:
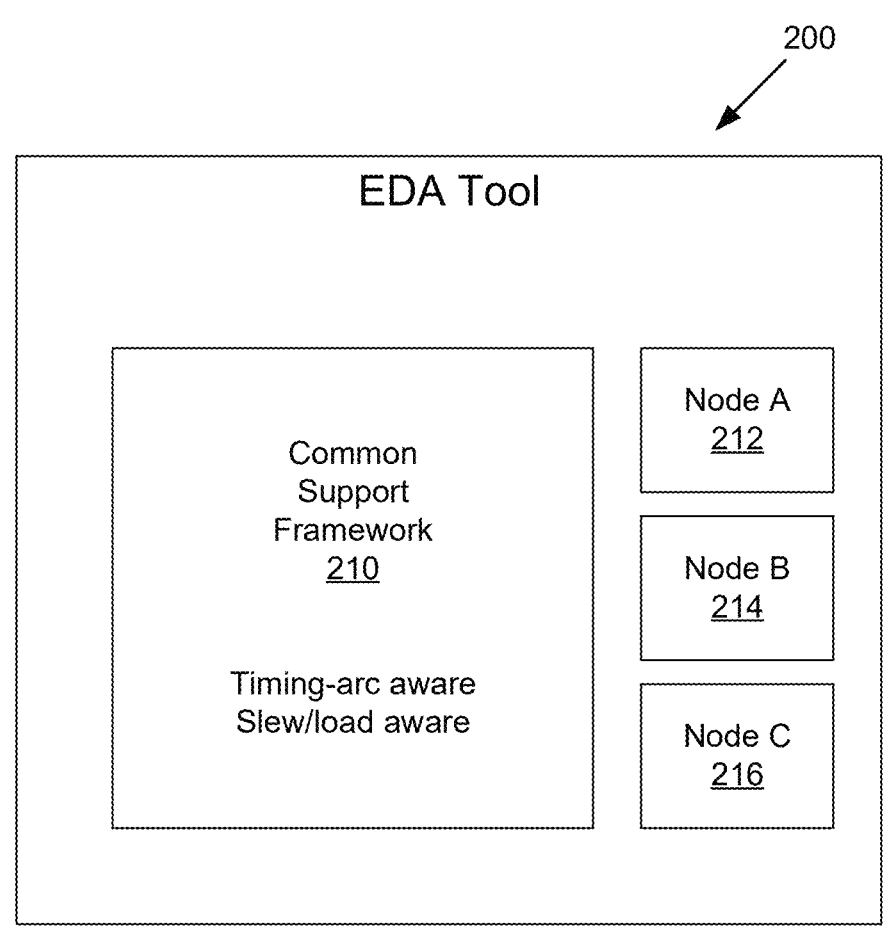
FIG. 2 is a block diagram illustrating a unified framework for accurate context-aware timing modeling in accordance with some embodiments of the present disclosure.

FIG. 2 is a block diagram illustrating a unified framework for accurate context-aware timing modeling in accordance with some embodiments of the present disclosure. In the proposed unified modeling framework for an electronic design automation (EDA) tool 200, the LDE impact on timing is divided into two major components, including a technology-dependent component, and a technology-independent component. The technology-dependent component defines the collection of unique contexts or boundary conditions of for specific technology nodes, such as node A 212, node B 214, and node C 216. Conversely, the technology-independent component, which is represented by common support framework 210, accurately models timing impact of a given context or boundary condition. This methodology can enable unified support among all technology nodes, and can significantly reduce development and maintenance costs of context-aware timing support in EDA tool 200, all while accounting for the huge number of possible LDE combinations for a typical standard cell.

For example, a given cell might have a certain number of boundaries (e.g., four boundaries including two on the left and two on the right). In other embodiments, there can be any other number of boundaries (e.g., two boundaries, six boundaries, eight boundaries, etc.), and such boundaries can be located at any position (e.g., left and right boundaries in the same row of cells or top and bottom boundaries shared with different rows of cells). Any number of different neighboring cells can be placed at each of those boundaries in the final circuit design. Each of those neighboring cells can represent a different possible boundary condition based on the distance d of nearest boundary transistor. Say, for example, the boundary condition can be represented by a set of ten possible distances d={0, 1, 2, . . . , 8, 9} of the nearest boundary transistor in the neighboring cell. For the 10 possible boundary conditions at each of the four boundaries of the given cell, there would be approximately $10^4$ (i.e., 10,000+) possible timing characterizations for the given cell. Common support framework 210 can model the combined LDE impact from all boundaries with multiple separate LDE impacts from each of the boundaries individually (e.g., 10×4=40 possible timing characterizations) in order to generate a reasonable library characterization for a given cell.

Since the timing impact from each boundary is generally a small value compared to cell nominal delay (e.g., +/−10%), the proposed decomposition method implemented using common support framework 210 has very high accuracy in practice. For example, with an experimental LDE timing impact of up to 7.4% (see Table 1), the proposed approximation method is very accurate with the worst case error being only 1.12%, and with most data points being within 0.5% (see Table 2).

TABLE 1

| LDE impact from SPICE simulation | | | | |
| --- | --- | --- | --- | --- |
| LDE impact | avg | stdev | min | max |
| delay | −4.3% | 2.1% | −6.7% | 0.0% |
| slew | −4.7% | 2.3% | −7.4% | 0.0% |

TABLE 2

| Error: this disclosure vs. SPICE golden | | | | |
| --- | --- | --- | --- | --- |
| Error | avg | stdev | min | max |
| delay | −0.01% | 0.07% | −0.72% | 0.29% |
| slew | 0.00% | 0.12% | −0.71% | 1.12% |

Figure 3:
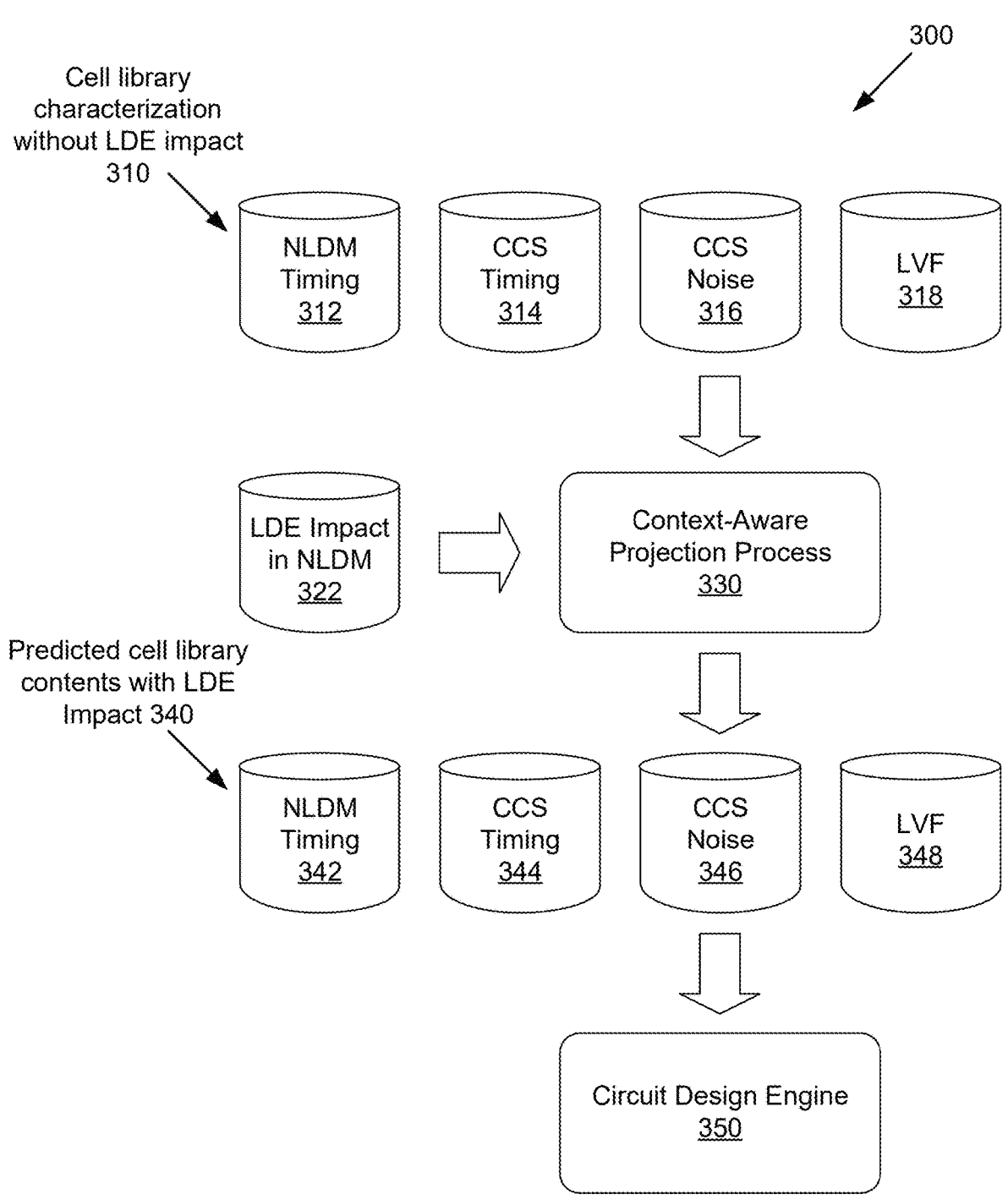
FIG. 3 is a flow diagram illustrating a process of deriving context-aware library characterization data for circuit design tools in accordance with some embodiments of the present disclosure.

FIG. 3 is a flow diagram 300 illustrating a process of deriving context-aware library characterization data for circuit design tools in accordance with some embodiments of the present disclosure. Circuit design tools, such as an STA engine, use library characterizations representing many different types of data to achieve the best accuracy. A typical modern library for a cell does not consider the LDE impact. In one embodiment, such a library 310 includes non-linear delay model (NLDM) timing data 312, composite current source (CCS) timing data 314, CCS noise data 316, and Liberty Variation Format (LVF) data 318. The NLDM timing data 312 characterizes input-to-output delay and output transition times with sensitivity to input transition time, output load and side input states. The NLDM timing data 312 for a cell can be generated in a relatively short period of time and the resulting size makes up a small portion of the overall size of the library 310. The CCS timing data 314 and CCS noise data 316 represent current waveforms flowing into and out of the cell, while also having sensitivity to input transition time, output load and side input states. The CCS timing data 314 and CCS noise data 316 can be generated relatively quickly, but are significantly larger in size, as compared to NLDM timing data 312, for example. LVF data 318 includes timing information, such as cell delays and transition times, but further includes statistical variation information. Generating the LVF data 318 involves Monte Carlo analysis of the library cell netlists, and thus takes a relatively long amount of time (i.e., considerably longer than generating the NLDM timing data 312).

In one embodiment, instead of characterizing context-aware library data for all portions of the library 310, the LDE impact is considered only for the NLDM data 322. All other context-aware library data can be computed using a context-aware projection process 330, which based on existing data from library 310 (i.e., CCS timing data 314, CCS noise data 316, and LVF data 318) and the LDE impact on the NLDM data 322. For example, process 330 can receive CCS timing data 314, CCS noise data 316, and LVF data 318, along with the NLDM LDE impact data 322 as inputs and generate a predicted cell library contents 340 with the LDE impact. Predicted cell library contents 340 can include context-aware NLDM timing data 342 which can be directly determined using the NLDM LDE impact data 322, and context-aware CCS timing data 344, CCS noise data 346, and LVF data 348, which include projected data (i.e., predictions, estimates) rather than directly determined data. Additional details with respect to the context-aware projection process 330 are described below.

Figure 4:
FIG. 4 is a flow diagram illustrating a process for accurate context-aware timing modeling in integrated circuit design in accordance with some embodiments of the present disclosure.
Figure 4:
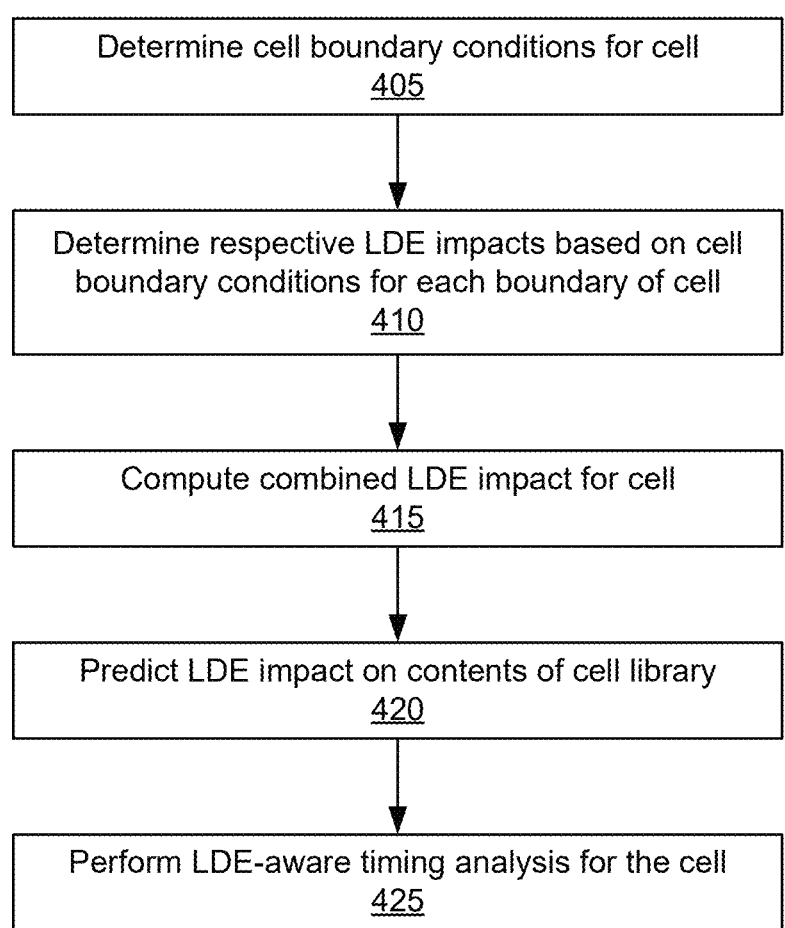

FIG. 4 is a flow diagram illustrating a process for accurate context-aware timing modeling in integrated circuit design in accordance with some embodiments of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. In one embodiment, method 400 may be performed by common support framework 210 of EDA tool 200, as shown in and FIG. 2.

Referring again to FIG. 4, at operation 405, the processing logic determines cell boundary conditions for each of a plurality of boundaries of a cell in an integrated circuit layout. In one embodiment, to determine the cell boundary conditions the processing logic is to identify a presence of one or more neighboring cells at each of the plurality of boundaries of the cell in the integrated circuit layout. For example, there can be one or more neighboring cells at a left boundary of the cell and one or more neighboring cells at a right boundary of the cell. In one embodiment, the boundary condition is represented by a distance between a boundary transistor in the cell and the nearest boundary transistor in each neighboring cell. In other embodiments, the boundary condition is represented in some other manner.

At operation 410, the processing logic determines respective layout dependent effect (LDE) impacts based on the cell boundary conditions for each of the plurality of boundaries of the cell. In one embodiment, the processing logic can consult a lookup table or other data structure comprising a plurality of entries. Each entry can be associated with a different possible boundary condition and can include an indication of a pre-characterized LDE impact for the corresponding boundary condition. In one embodiment, the information stored in each entry of the lookup table includes the LDE impact on the NLDM data 322, as shown in FIG. 3. In one embodiment, the LDE impact on NLDM data (per LDE boundary per integer distance) is characterized in the library by a library characterization tool. For example, the LDE impact for different boundary conditions can be measured from simulation data (e.g., from a SPICE simulation) and stored in a corresponding entry of the lookup table or other data structure.

At operation 415, the processing logic computes a combined LDE impact for the plurality of boundaries of the cell. In one embodiment, to compute the combined LDE impact, the processing logic can combine the respective LDE impacts for each of the plurality of boundaries of the cell using linear superposition. In one embodiment, the processing logic uses the combination as a model of the total LDE impact from all boundaries based on the respective LDE impacts for each boundary. It could be multiplicative form when $$f_i(cond_{boundary_i}) \text{ is around } 1.0:$$

$$\text{Delay}\left(cond_{boundary_1}, cond_{boundary_2}, \ldots, cond_{boundary_n}\right)$$

$$= \text{Delay}_{nominal} * \prod f_i(cond_{boundary_i})$$

$$\text{Transition}\left(cond_{boundary_1}, cond_{boundary_2}, \ldots, cond_{boundary_n}\right)$$

$$= \text{Transition}_{nominal} * \prod f_i(cond_{boundary_i})$$

Or summation form:

$$\text{Delay}\left(cond_{boundary_1}, cond_{boundary_2}, \ldots, cond_{boundary_n}\right)$$

$$= \text{Delay}_{nominal} + \sum f_i(cond_{boundary_i})$$

$$\text{Transition}\left(cond_{boundary_1}, cond_{boundary_2}, \ldots, cond_{boundary_n}\right)$$

$$= \text{Transition}_{nominal} + \sum f_i(cond_{boundary_i})$$

This approach decomposes a N-dimensional problem into N 1-dimensional problems, thereby significantly reducing the characterization cost. Using the previous example, the complexity is reduced from 10^4=10,000 to 10×4=40.

At operation 420, the processing logic generates a prediction of an LDE impact on one or more contents of a library associated with the cell. In one embodiment, the one or more contents of the library comprise at least one of CCST, CCSN, or LVF. These contents of the library associated with the cell do not already account for LDE impact. The process of generating a prediction will be described below using CCS timing (CCST) data 314 as an example. It should be understood, however, that a similar process could be used to predict the LDE impact on CCS noise data 316, or LVF data 318, as well.

Figure 5A:
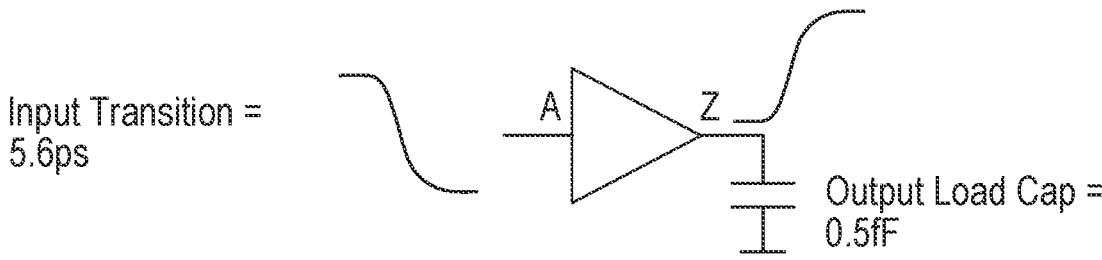
FIG. 5A illustrates one arc with certain input slew and output load capacitance in accordance with some embodiments of the present disclosure.

Using CCS timing data 314 calibration as an example, the inputs can include NLDM timing data 312 without LDE impact, NLDM timing data 342 with LDE impact, and CCS timing data 314 without LDE impact, while the output includes the CCS timing data 344 with LDE impact. The NLDM timing data 312 in the library 310 can be defined as arc delay and output pin transition with certain input pin transition and output load cap. The CCS timing data 313 in the library 310 can be defined as the current driving curve with certain input slew and output load capacitance considerations. FIG. 5A illustrates one arc with certain input slew and output load capacitance in accordance with some embodiments of the present disclosure. When considering the A→Z arc output rise edge, for example, the NLDM timing data in the library can include the following:

Without LDE impact: cell_rise delay=30.9 ps, rise_transition=19.0 ps

With LDE impact: cell_rise delay=34.8 ps, rise_transition=25.2 ps

Figure 5B:
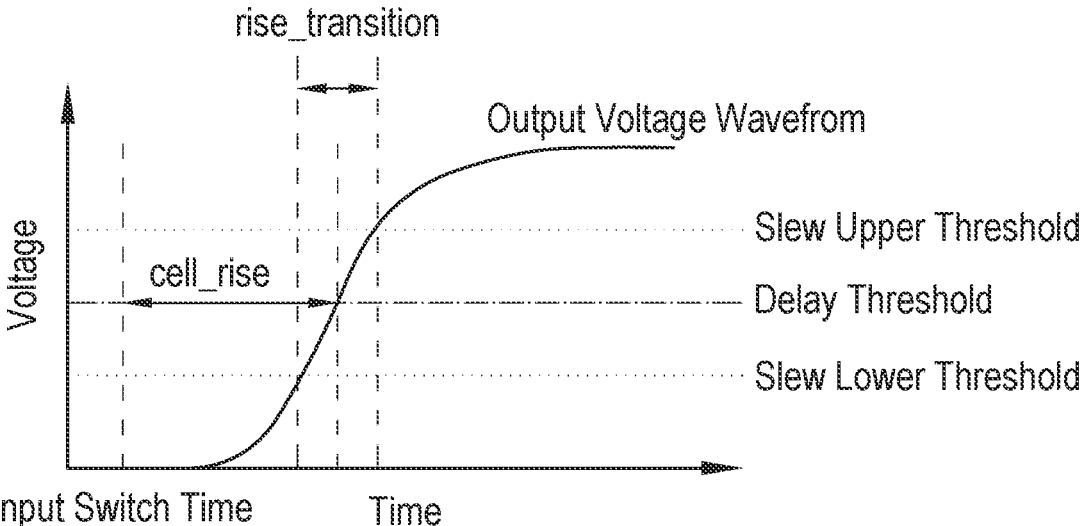
FIG. 5B is a graph illustrating the definition of NLDM delay/transition based on output voltage waveform in accordance with some embodiments of the present disclosure.
Figure 5C:
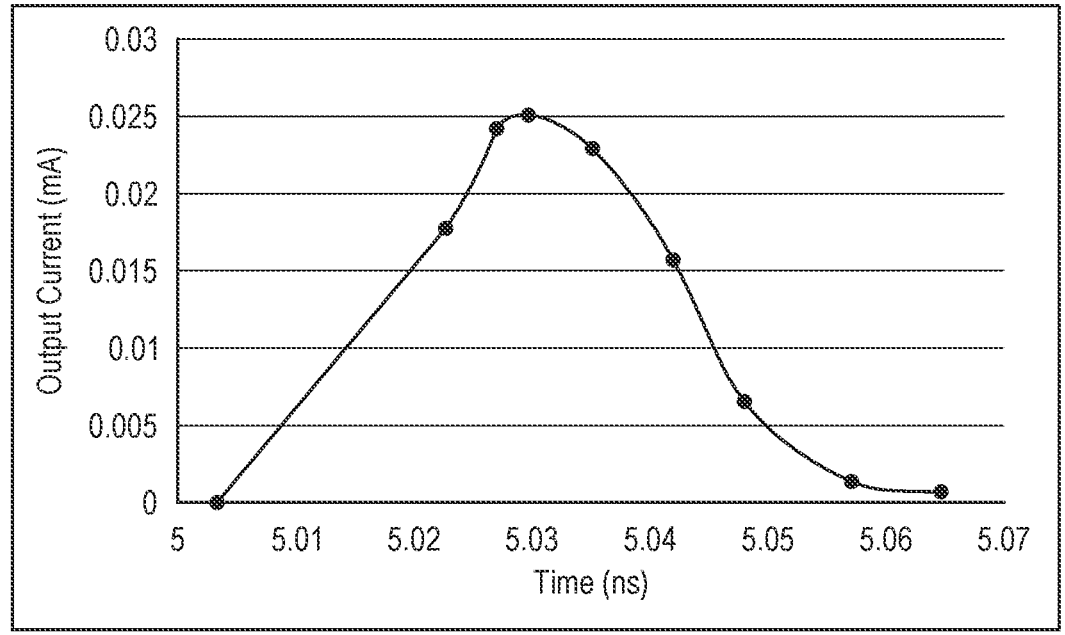
FIG. 5C is a graph illustrating CCST output rise current without LDE impact in accordance with some embodiments of the present disclosure.

The definition of cell_rise delay and rise_transition can be found in FIG. 5B, which is a graph illustrating the definition of NLDM delay/transition based on output voltage waveform in accordance with some embodiments of the present disclosure. In addition, CCS timing data in the library is stored as current curve as shown in FIG. 5C, which is a graph illustrating CCST output rise current without LDE impact in accordance with some embodiments of the present disclosure.

Since voltage (V)/current (I) on lumped load capacitance can be modeled as follows, CCS timing current curve in library (without LDE impact) can be converged to CCST voltage curve by $$V(t) = C \int I(t)$$

This innovation estimate CCST V(t) curve with LDE impact by shift and stretch the V(t) curve based on NLDM delay/slew with and without LDE impact:

$$t_{LDE} = NLDM_{delay_{LDE}} + \frac{NLDM_{slew_{LDE}}}{NLDM_{slew_{original}}} * \left(t_{original} - NLDM_{delay_{original}}\right)$$

After that, estimated CCST voltage curve with LDE impact is converge back to current curve with LDE impact by:

$$I(t) = C\frac{dV}{dt}$$

Figure 6:
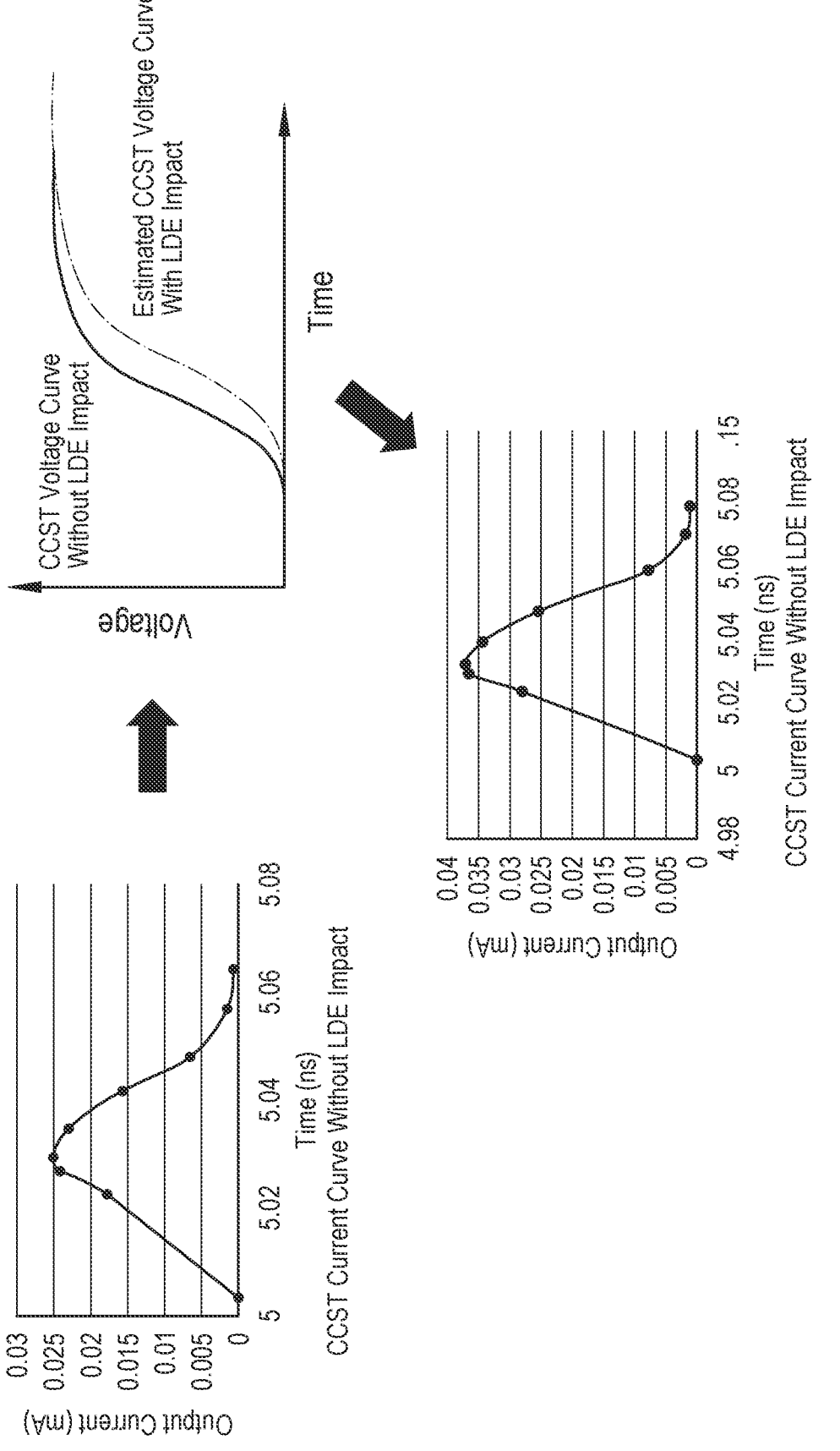
FIG. 6 includes graphs illustrating CCST timing data with LDE impact calibration in accordance with some embodiments of the present disclosure.

FIG. 6 includes graphs illustrating CCST timing data with LDE impact calibration in accordance with some embodiments of the present disclosure. A similar approach can be used for CCSN and LVF calibration. This part of the innovation can significantly reduce library size and characterization runtime overhead. It avoids characterizing CCST/CCSN (very large file size overhead), and LVF (very large characterization runtime overhead). In addition, more reduction of overhead can be achieved by using sparse NLDM table.

Referring again to FIG. 4, at operation 425, the processing logic performs an LDE-aware timing analysis for the cell based on the prediction of the LDE impact on the one or more contents of the library. In one embodiment, the processing logic further uses the respective LDE impacts for each of the plurality of boundaries to perform the LDE-aware timing analysis. In one embodiment, the timing analysis can be performed by existing static timing analysis (STA) tools. This timing analysis, however, more accurately models the behavior of the cell instance as it accounts for LDE impacts on the timing. The timing analysis can be used by electronic design automation (EDA) in conjunction with an integrated circuit design process and can result in performance power area (PPA) optimization, for example, among other benefits.

Figure 7:
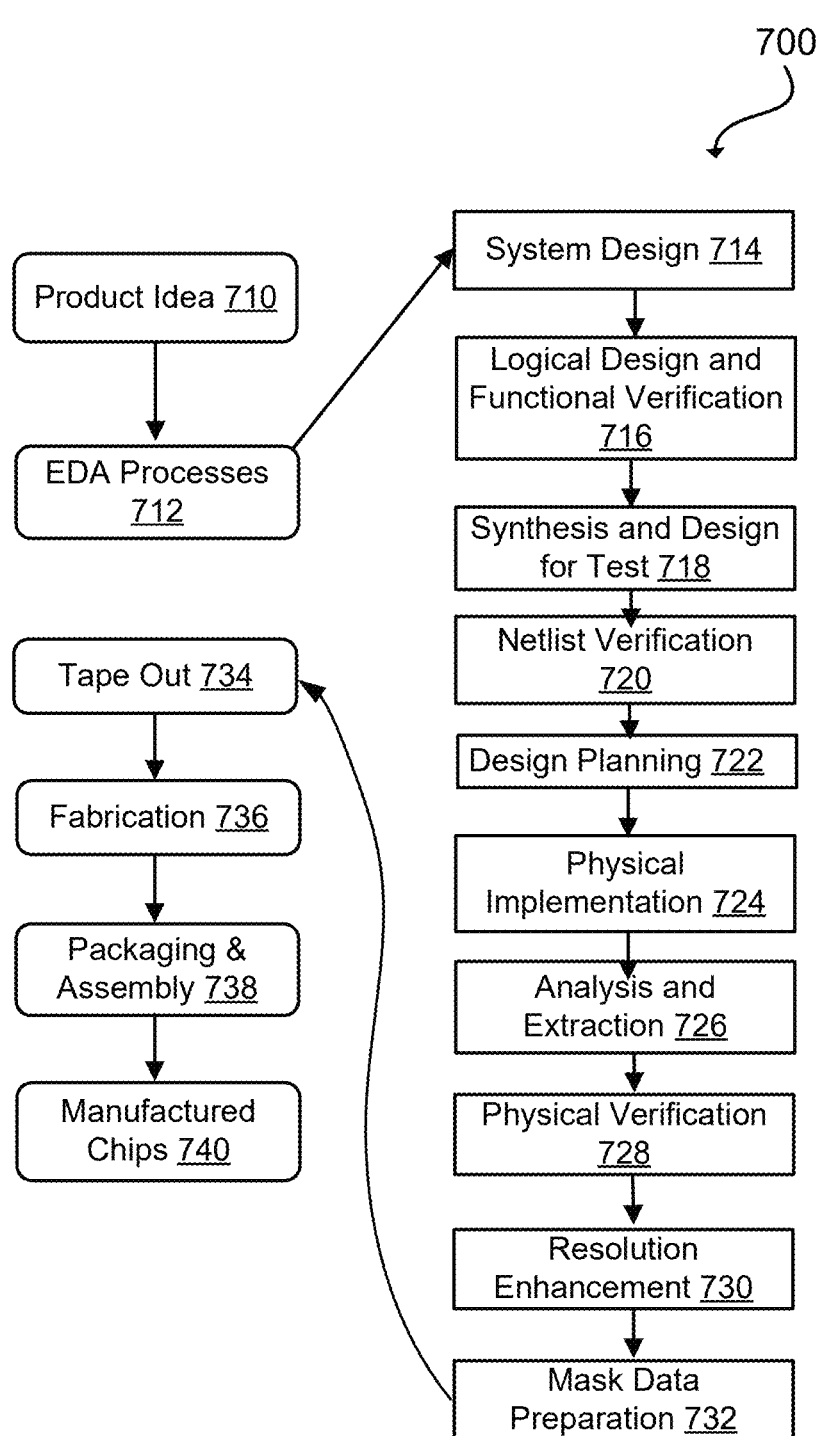
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes can start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die can be fabricated 736 and packaging and assembly processes 738 can be performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which can be used for detailed descriptions of circuits with many analog components. Descriptions at each level of abstraction are enabled for use by the corresponding tools of that layer (e.g., a formal verification tool). A design process may use a sequence depicted in FIG. 7. The processes described herein can be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit can be specified in one or more description languages and the specification can be checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' can be used to speed up the functional verification.

During synthesis and design for test 718, HDL code can be transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist can be checked for compliance with timing constraints and for correspondence with the HDL code. During design planning 722, an overall floor plan for the integrated circuit can be constructed and analyzed for timing and top-level routing.

During layout or physical implementation 724, physical placement (positioning of circuit components such as transistors or capacitors) and routing (connection of the circuit components by multiple conductors) can occur, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and can be enabled as both physical structures and in simulations. Parameters can be specified for selected cells (based on 'standard cells') such as size and made accessible in a database for use by EDA products.

During analysis and extraction 726, the circuit function can be verified at the layout level, which permits refinement of the layout design. During physical verification 728, the layout design can be checked to ensure that manufacturing constraints are correct, such as DRC constraints, electrical constraints, lithographic constraints, and that circuitry function matches the HDL design specification. During resolution enhancement 730, the geometry of the layout can be transformed to improve how the circuit design is manufactured.

During tape-out, data can be created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 8:
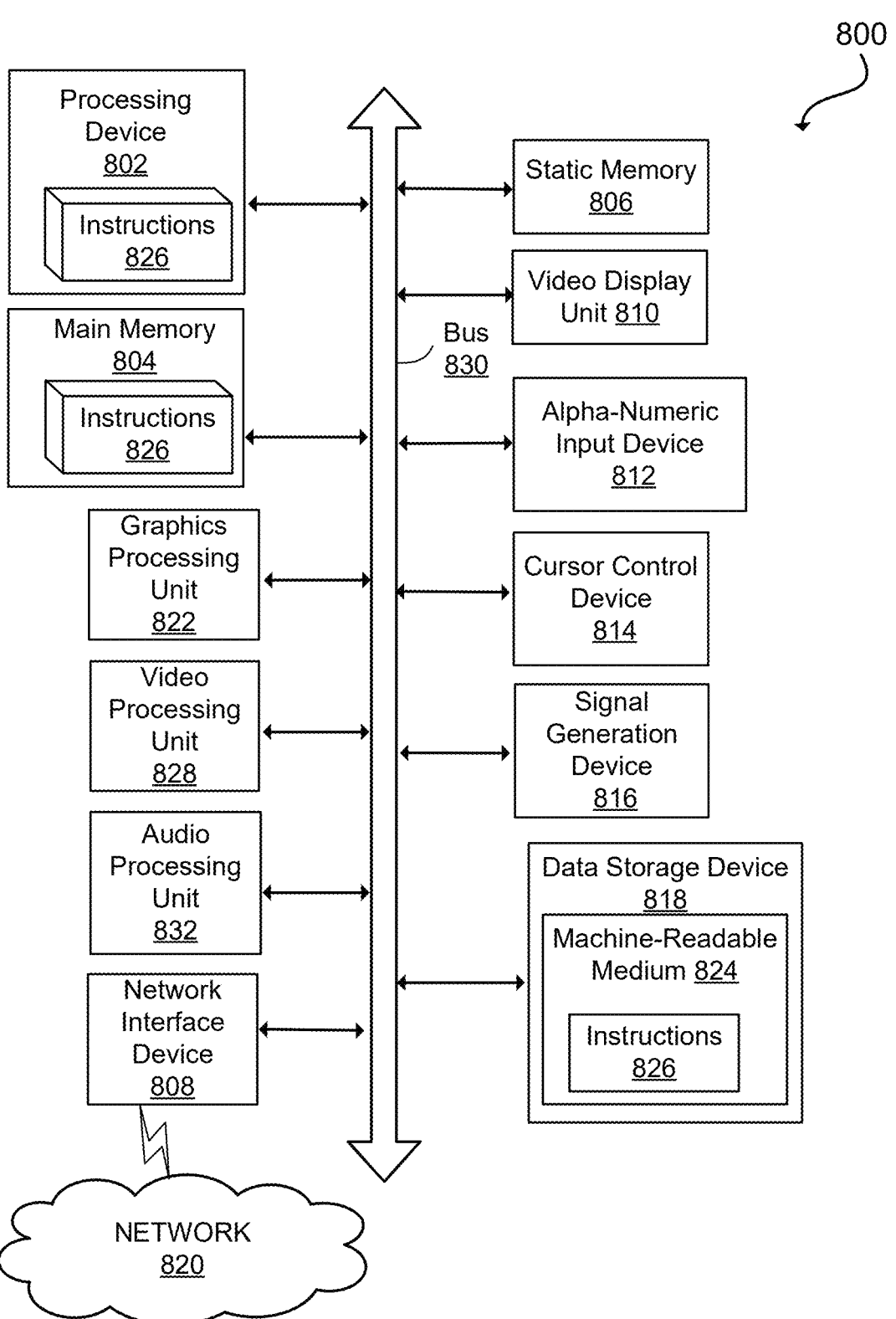
FIG. 8 depicts an abstract diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, which may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

determining, by a processing device, cell boundary conditions for each of a plurality of boundaries of a cell in an integrated circuit layout;

determining, by the processing device, layout dependent effect (LDE) impact data for the cell based on the cell boundary conditions for each of the plurality of boundaries of the cell;

generating, by the processing device, a prediction of an LDE impact on one or more contents of a library associated with the cell, wherein generating the prediction comprises converting existing composite current source (CCS) timing data from existing library data to voltage data, modifying the voltage data based on a ration of non-linear delay model (NLDM) data with the LDE impact NLDM data without the LDE impact, and converting the modified voltage data back to current data to generate predicted cell library contents that include context-aware versions of the existing library data; and performing, by the processing device, an LDE-aware timing analysis for the cell based on the prediction of the LDE impact on the one or more contents of the library.

2. The method of claim 1, wherein determining the cell boundary conditions comprises identifying a presence of one or more neighboring cells at each of the plurality of boundaries of the cell in the integrated circuit layout.

3. The method of claim 1, wherein the LDE impact data is based on non-linear delay model (NLDM) timing data for the cell.

4. The method of claim 1, wherein determining the LDE impact data for the cell comprises determining respective LDE impacts based on the cell boundary conditions for each of the plurality of boundaries of the cell.

5. The method of claim 3, further comprising:

computing, by the processing device, a combined LDE impact for the plurality of boundaries of the cell, wherein computing the combined LDE impact comprises combining the respective LDE impacts for each of the plurality of boundaries of the cell using linear superposition.

6. The method of claim 1, wherein the one or more contents of the library comprise at least one of composite current source timing (CCST) data, composite current source noise (CCSN) data, or Liberty Variation Format (LVF) data, and wherein the one or more contents of the library associated with the cell do not already account for LDE impact.

7. The method of claim 1, wherein the cell comprises one instance of a standard cell among a plurality of cells in an integrated circuit design, and wherein the method further comprises performing an LDE-aware timing analysis for each of the plurality of cells in the integrated circuit design.

8. A system comprising:

a memory; and a processing device, coupled to the memory, and configured to perform operations comprising:

determining cell boundary conditions for each of a plurality of boundaries of a cell in an integrated circuit layout;

determining layout dependent effect (LDE) impact data for the cell based on the cell boundary conditions for each of the plurality of boundaries of the cell;

generating a prediction of an LDE impact on one or more contents of a library associated with the cell, wherein generating the prediction comprises converting existing composite current source (CCS) timing data from existing library data to voltage data, modifying the voltage data based on a ration of non-linear delay model (NLDM) data with the LDE impact NLDM data without the LDE impact, and converting the modified voltage data back to current data to generate predicted cell library contents that include context-aware versions of the existing library data; and performing an LDE-aware timing analysis for the cell based on the prediction of the LDE impact on the one or more contents of the library.

9. The system of claim 8, wherein determining the cell boundary conditions comprises identifying a presence of one or more neighboring cells at each of the plurality of boundaries of the cell in the integrated circuit layout.

10. The system of claim 8, wherein the LDE impact data is based on non-linear delay model (NLDM) timing data for the cell.

11. The system of claim 8, wherein determining the LDE impact data for the cell comprises determining respective LDE impacts based on the cell boundary conditions for each of the plurality of boundaries of the cell.

12. The system of claim 11, wherein the processing device is to perform operations further comprising:

computing a combined LDE impact for the plurality of boundaries of the cell, wherein computing the combined LDE impact comprises combining the respective LDE impacts for each of the plurality of boundaries of the cell using linear superposition.

13. The system of claim 8, wherein the one or more contents of the library comprise at least one of composite current source timing (CCST) data, composite current source noise (CCSN) data, or Liberty Variation Format (LVF) data, and wherein the one or more contents of the library associated with the cell do not already account for LDE impact.

14. The system of claim 8, wherein the cell comprises one instance of a standard cell among a plurality of cells in an integrated circuit design, and wherein the method processing device is to perform operations further comprising:

performing an LDE-aware timing analysis for each of the plurality of cells in the integrated circuit design.

15. A non-transitory computer-readable storage medium storing instructions which, when executed, cause a processing device to perform operations comprising:

determining cell boundary conditions for each of a plurality of boundaries of a cell in an integrated circuit layout;

determining layout dependent effect (LDE) impact data for the cell based on the cell boundary conditions for each of the plurality of boundaries of the cell;

generating a prediction of an LDE impact on one or more contents of a library associated with the cell, wherein generating the prediction comprises converting existing composite current source (CCS) timing data from existing library data to voltage data, modifying the voltage data based on a ration of non-linear delay model (NLDM) data with the LDE impact NLDM data without the LDE impact, and converting the modified voltage data back to current data to generate predicted cell library contents that include context-aware versions of the existing library data; and performing an LDE-aware timing analysis for the cell based on the prediction of the LDE impact on the one or more contents of the library.

16. The non-transitory computer-readable storage medium of claim 15, wherein determining the cell boundary conditions comprises identifying a presence of one or more neighboring cells at each of the plurality of boundaries of the cell in the integrated circuit layout.

17. The non-transitory computer-readable storage medium of claim 15, wherein the LDE impact data is based on non-linear delay model (NLDM) timing data for the cell.

18. The non-transitory computer-readable storage medium of claim 15, wherein determining the LDE impact data for the cell comprises determining respective LDE impacts based on the cell boundary conditions for each of the plurality of boundaries of the cell.

19. The non-transitory computer-readable storage medium of claim 18, wherein the instructions cause the processing device to perform operations further comprising:

computing a combined LDE impact for the plurality of boundaries of the cell, wherein computing the combined LDE impact comprises combining the respective LDE impacts for each of the plurality of boundaries of the cell using linear superposition.

20. The non-transitory computer-readable storage medium of claim 15, wherein the one or more contents of the library comprise at least one of composite current source timing (CCST) data, composite current source noise (CCSN) data, or Liberty Variation Format (LVF) data, and wherein the one or more contents of the library associated with the cell do not already account for LDE impact.

\* \* \* \* \*